United States Patent
Sandoval-Castillo et al.

(10) Patent No.: US 9,860,676 B2
(45) Date of Patent: Jan. 2, 2018

(54) PROCESS INSTRUMENTATION WITH WIRELESS CONFIGURATION

(71) Applicant: Rosemount Inc., Shakopee, MN (US)

(72) Inventors: Virgilio D. Sandoval-Castillo, Brooklyn Park, MN (US); Jason Krause, Chaska, MN (US)

(73) Assignee: Rosemount Inc., Shakopee, MN (US)

( * ) Notice: Subject to any disclaimer, the term of this patent is extended or adjusted under 35 U.S.C. 154(b) by 63 days.

(21) Appl. No.: 14/691,955

(22) Filed: Apr. 21, 2015

(65) Prior Publication Data

US 2016/0314685 A1  Oct. 27, 2016

(51) Int. Cl.
| | |
|---|---|
| G08B 29/00 | (2006.01) |
| H04W 4/00 | (2009.01) |
| H04W 24/04 | (2009.01) |
| G05B 23/00 | (2006.01) |
| G08C 15/06 | (2006.01) |
| G05B 11/01 | (2006.01) |

(52) U.S. Cl.
CPC ............ H04W 4/005 (2013.01); G05B 23/00 (2013.01); H04W 24/04 (2013.01)

(58) Field of Classification Search
CPC ....... G08B 29/02; H04W 4/005; H04W 24/04
USPC ........................................................ 340/506
See application file for complete search history.

(56) References Cited

U.S. PATENT DOCUMENTS

| | | | |
|---|---|---|---|
| 2012/0230309 A1 | 9/2012 | Junk | |
| 2013/0141888 A1 | 6/2013 | Wittmer et al. | |
| 2013/0190897 A1* | 7/2013 | Junk | G05B 19/042 700/12 |
| 2013/0191556 A1 | 7/2013 | Holmstadt | |
| 2014/0194817 A1* | 7/2014 | Lee | A61M 5/14228 604/151 |
| 2015/0276432 A1* | 10/2015 | Repyevsky | G05B 19/048 340/870.03 |
| 2015/0280788 A1* | 10/2015 | Ryu | H04B 5/0031 455/41.1 |
| 2016/0182285 A1* | 6/2016 | Ferguson | H04L 67/34 709/228 |

OTHER PUBLICATIONS

"Rosemount 752 Foundation TM fieldbus Remote Indicator", Product Data Sheet, Sep. 2014, Emerson Process Management, available at: <www.rosemount.com>.
International Search Report and Written Opinion for International Application No. PCT/US2016/028363, dated Jul. 27, 2016, date of filing: Apr. 20, 2016, 17 pages.

* cited by examiner

*Primary Examiner* — Jack K Wang
(74) *Attorney, Agent, or Firm* — Christopher R. Christenson; Kelly, Holt & Christenson PLLC

(57) ABSTRACT

A method of automatically configuring a remote indicator is provided. The method includes placing the remote indicator within near field communication range of an operating field device. Configuration information is wirelessly exchanged between the remote indicator and the field device. The remote indicator is coupled to receive process information. Process information is received through the coupling and displayed on a display of the remote indicator. A field device and remote indicator are also provided.

23 Claims, 9 Drawing Sheets

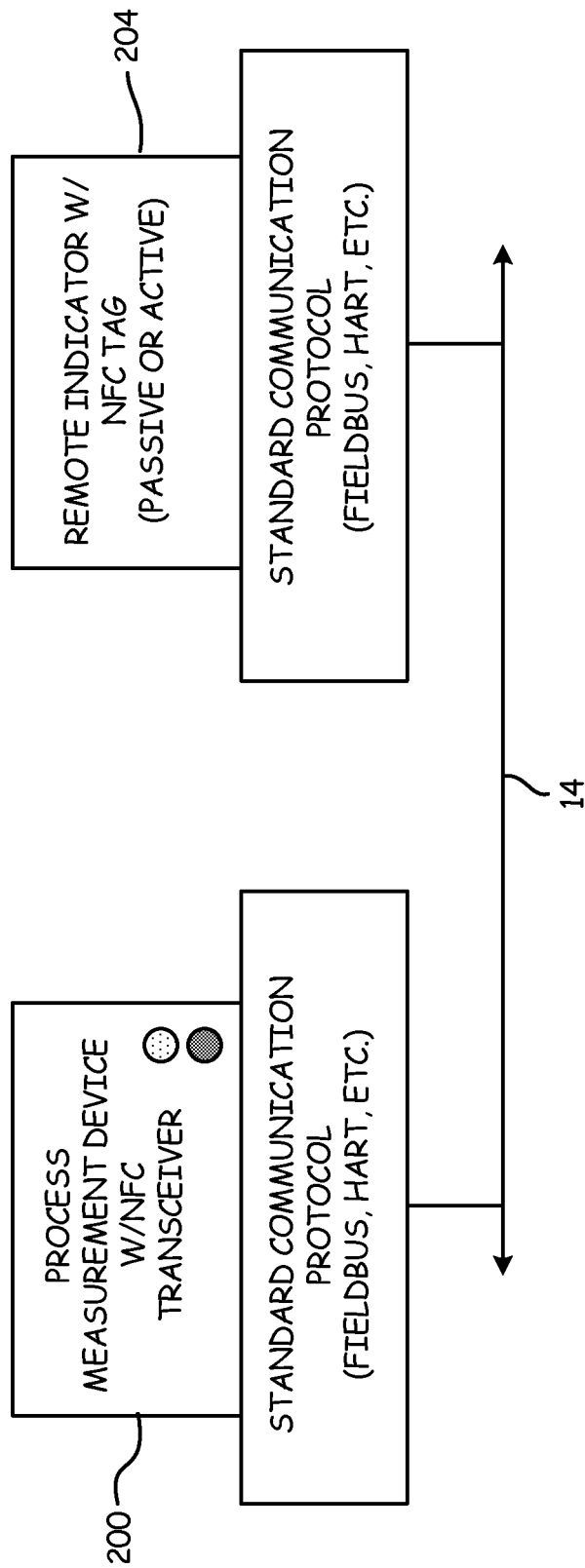

PROCESS INSTRUMENTATION WITH WIRELESS CONFIGURATION

BACKGROUND

In industrial settings, control systems are used to monitor and control inventories of industrial and chemical processes, and the like. Typically, the control system performs these functions using field devices distributed in key locations in the industrial process and coupled to control circuitry in a control room by a process control loop or segment. The term "field device" refers to any device that performs a function in a distributed control system or process monitoring system, including all devices used in the measurement control and monitoring of industrial processes.

Field devices are used by the process control and measurement industry for a variety of purposes. Usually, such field devices have a field-hardened enclosure so that they can be installed outdoors in relatively rugged environments and be able to withstand climatological extremes of temperature, humidity, vibration, mechanical shock, etc. These field devices can also operate on relatively low power. For example, some field devices are able to operate solely on power that they received through a process communication loop or a segment sometimes with an operating current at or below 20 milliamps.

Some field devices measure a process characteristic and compute and transmit a process variable related to the measurement. These process variable transmitters can be used to provide information to the control room or monitoring station relative to temperature, pressure, flow, pH, turbidity, level, or any other suitable process variables.

In some instances, it may be useful to provide an indication of the process variable next to a final control device or to display information from one or more transmitters that are mounted in relatively inaccessible locations. In such instances, a field device known as a remote indicator is used. A remote indicator can be located anywhere along the process control loop or segment to allow information to be displayed wherever it is required. In some instances, the remote indicator can also perform basic arithmetic operations on the process variable(s) such that the indicated quantity is a calculated value.

SUMMARY

A method of automatically configuring a remote indicator is provided. The method includes placing the remote indicator within near field communication range of an operating field device. Configuration information is wirelessly exchanged between the remote indicator and the field device. The remote indicator is coupled to receive process information. Process information is received through the coupling and displayed on a display of the remote indicator. A field device and remote indicator are also provided.

BRIEF DESCRIPTION OF THE DRAWINGS

FIG. 5B is a diagrammatic view of a field device and remote indicator coupled to process communication loop or segment.

DETAILED DESCRIPTION OF ILLUSTRATIVE EMBODIMENTS

Configuration of process control equipment can be an intimidating procedure that has a significant possibility for human errors to occur. The configuration procedure for remote indicators generally requires a significant amount of knowledge specific to the particular product. Moreover, the configuration procedure requires that the technician configuring the remote indictor follow instructions from the manufacturer of the field device and/or remote indicator precisely. Embodiments of the present invention, set forth below, generally facilitate remote indicator configuration even when one or more field devices from which process variable information will be indicated is currently functioning in a process control environment. Accordingly, since one or more of the field devices may be currently engaged in important aspects of process control, it is important that the process control function not be interrupted in order to configure the remote indicator. Further, since the field device may be located in a relatively inaccessible location, significant physical interactions with the operating field device are disfavored.

Figure 1:
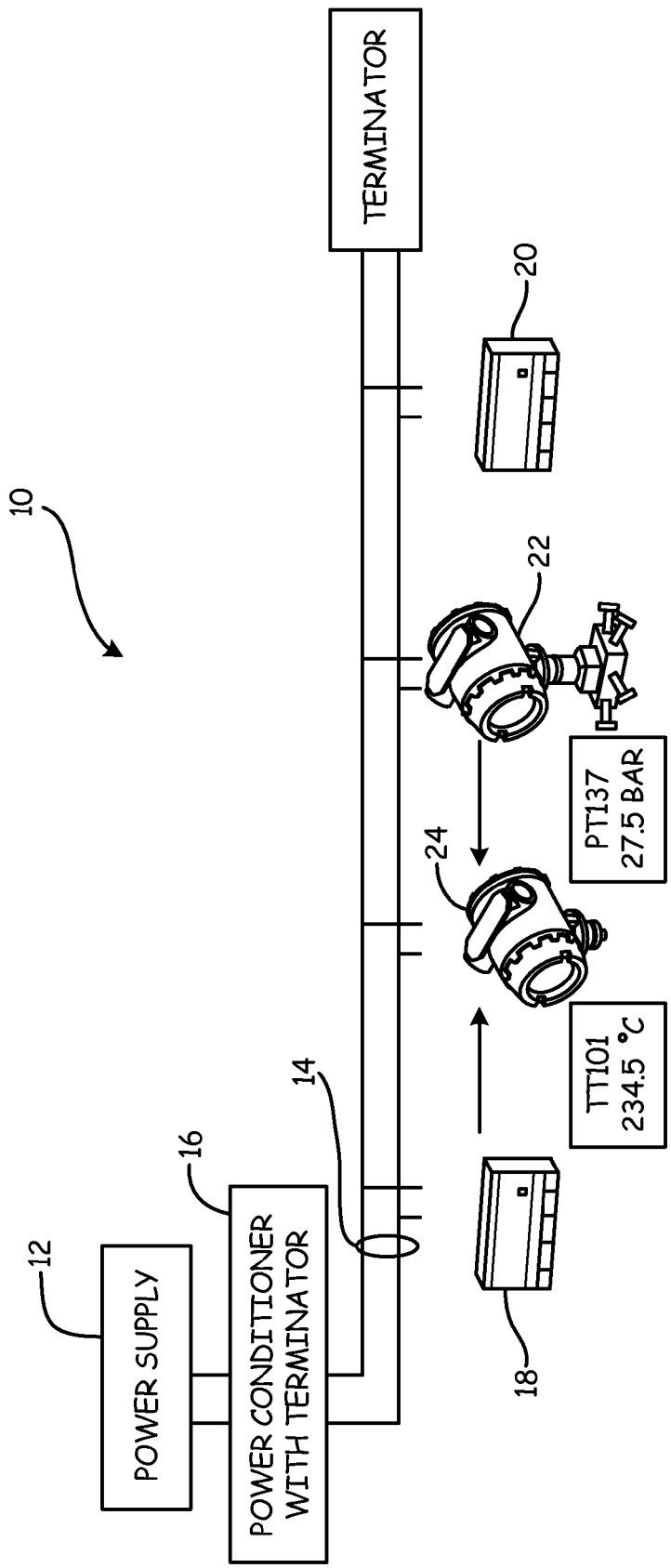
FIG. 1 is a diagrammatic view of a process monitoring system with which embodiments of the present invention are particularly useful.

FIG. 1 is a diagrammatic view of a process monitoring system with which embodiments of the present invention are particularly useful. System 10 includes a power supply 12, which may be a known 24 volt power supply that energizes process control loop or segment 14 via power conditioner with terminator 16. Process control loop or segment 14 operates in accordance with a known process communication protocol, such as the FOUNDATION™ Fieldbus protocol, the Highway Addressable Remote Transducer (HART®) protocol, PROFIBUS, or any other suitable process communication protocol. Some process communication protocols are able to operate effectively in an energy-limited situation such that the electrical energy of the loop or segment is of such low level that it may pass into explosive or highly volatile process environments without compromising the safety of such environments. Additionally, some process communication protocols also typically operate more effectively for process control and measurement tasks than a data communication network protocol. Finally, at least some process communication protocols, such as FOUNDATION™ Fieldbus and HART® are able to wholly power field devices attached to such process communication loops or segments. Accordingly, attached field devices may be operable solely on energy received through the communication media to which they are coupled. Further still, at least some process communication protocols employ wireless communication, such as that in accordance with IEC 62591 (WirelessHART). In such embodiments, while the field device is communicatively coupled to the wireless process communication network, there is not physical connection between the wireless process communication network and the field device.

In FIG. 1, multi-channel temperature transmitters 18 and 20 are coupled to process control loop or segment 14 and provide information relative to process temperature over process communication loop or segment 14. Additionally, a process pressure transmitter 22 is also configured to measure a process variable pressure and convey process pressure information over process control loop or segment 14. Remote indicator 24 is also coupled to process communication loop or segment 14 and is configured to display process variable information relative to multi-channel temperature transmitters 18, 20 as well as process pressure transmitter 22. Once properly configured, remote indicator 24 is able to identify and/or receive process variable information available on process communication loop or segment 14 that remote indicator 24 is configured to display. Upon detecting/receiving such information, remote indicator 24 displays information indicative of the process variable(s) on a display of the remote indicator. Typically, the display is a relatively general-purpose digital display, such as a liquid crystal display. Additionally, like field devices 18, 20 and 22, remote indicator 24 is also, in some embodiments, able to be wholly powered by process communication loop or segment 14.

Current techniques for configuring remote indicator 24 generally require a user or technician to manually configure the remote indicator 24 in order to pair or otherwise associate the remote indicator with one or more field devices that are attached to the process. As set forth above, these manual operations are potentially error-prone and can be frustrating.

Embodiments of the present invention generally provide a significantly improved system and method for configuring remote indicators. Aspects of the present invention can be embodied in improved field devices as well as improved remote indicators. Further, embodiments of the present invention include a method for pairing or otherwise associating a remote indicator with one or more field devices.

Figure 2:
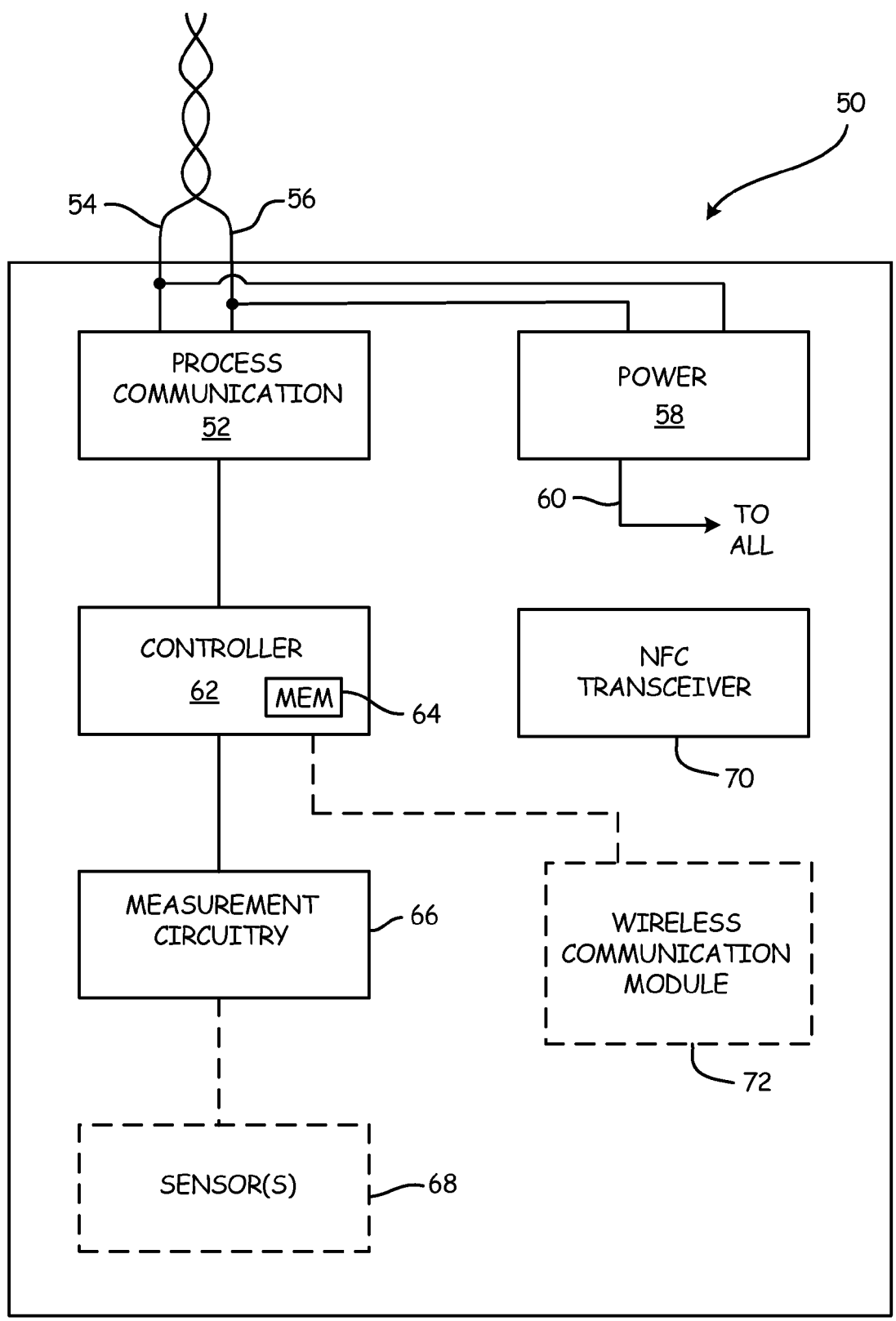
FIG. 2 is a block diagram of a process variable transmitter in accordance with an embodiment of the present invention.

FIG. 2 is a block diagram of a field device such as a process variable transmitter in accordance with an embodiment of the present invention. Process variable transmitter 50 can be any of process variable transmitters 18, 20 or 22 shown in FIG. 1, or any other process variable transmitter. Process variable transmitter 50 includes process communication circuitry 52 that is coupled to process communication loop or segment 14 via a plurality of conductors 54, 56. Additionally, a power module 58 is also coupled to conductors 54, 56. Power module 58 is adapted, in some embodiments, to receive energization power from conductors 54, 56 and provides suitable power to other components within process variable transmitter 50 as indicated by arrow 60 labeled "To All." Process variable transmitter 50 includes a controller 62 coupled to process communication circuitry 52 such that controller 62 is able to communicate process variable information, as well as other information, over a process communication loop or segment using process communication circuitry 52. Controller 62 may include, or be coupled to, suitable memory 64 which can store program data as well as process data. Memory 64 may include volatile and/or non-volatile memory. In one embodiment, controller 62 is a microprocessor with suitable memory 64 in order to programmatically execute a series of program steps. These steps are performed by controller 62 in order to provide its function as a process variable transmitter. Additionally, further steps are also stored within memory 64 to be executed by controller 62 in order to facilitate automatic wireless remote indicator configuration in accordance with embodiments of the present invention.

Process variable transmitter 50 also includes measurement circuitry 66 that is coupled to one or more sensors 68 in order to sense a process variable. Sensor(s) 68 may be disposed within process variable transmitter 50, such as a pressure sensor disposed within a process pressure transmitter, or may be disposed external to process variable transmitter 50 and coupled thereto via suitable wiring; for example, a temperature sensor disposed in a thermowell and coupled to measurement circuitry 66 via suitable wiring. Measurement circuitry 66 includes, in some embodiments, one or more analog-to-digital converters, as well as suitable linearization and/or amplification circuitry. Measurement circuitry 66 provides an indication of one or more sensed analog values to controller 62 in the form of a digital signal. Controller 62 receives the digital signal from measurement circuitry 66 and programmatically calculates one or more process variables that may be made available over a process communication loop or segment 14.

In accordance with an embodiment of the present invention, process variable transmitter 50 includes near field communication (NFC) transceiver 70. NFC transceiver 70 is coupled to controller 62 such that controller 62 is able to communicate in accordance with known near field communication techniques. NFC transceiver 70 is, in some embodiments, configured to power a passive NFC tag or device that is disposed within near field communication range of NFC transceiver 70. Accordingly, such passive tag need not receive independent power at the time that it communicates with NFC transceiver 70. Additionally, NFC transceiver 70 may provide the ability to interact with process variable transmitter 50 via other near field communicating devices, such as smartphones, tablets, or handheld configurators. While embodiments of the present invention will generally be described with respect to an active NFC transceiver powering a passive NFC tag, it is expressly contemplated that embodiments can be practiced using two "active" NFC transceivers communicating with one another. Further, embodiments of the present invention can be practiced where an NFC transceiver of a field device is passive and is powered by an active NFC in another device, such as a wireless gateway, that allows some type of configuration of the field device via the wireless gateway.

In some embodiments, process variable transmitter 50 may include an additional wireless communication module 72, which can allow process variable transmitter 50 to communicate in accordance with a longer range than is possible using NFC transceiver 70. For example, additional wireless communication module 72 can, in some embodiments, communicate at 2.4 GHz with other wireless device. Examples of wireless communication technologies that employ the 2.4 GHz frequency include the known Bluetooth and WiFi protocols. The utilization of both NFC transceiver 70 and additional wireless communication module 72 allows process variable transmitter 50 to pair or otherwise securely configure communication with an external device, such as a remote indicator, and subsequently communicate with the paired external device using the additional wireless communication module.

Figure 3:
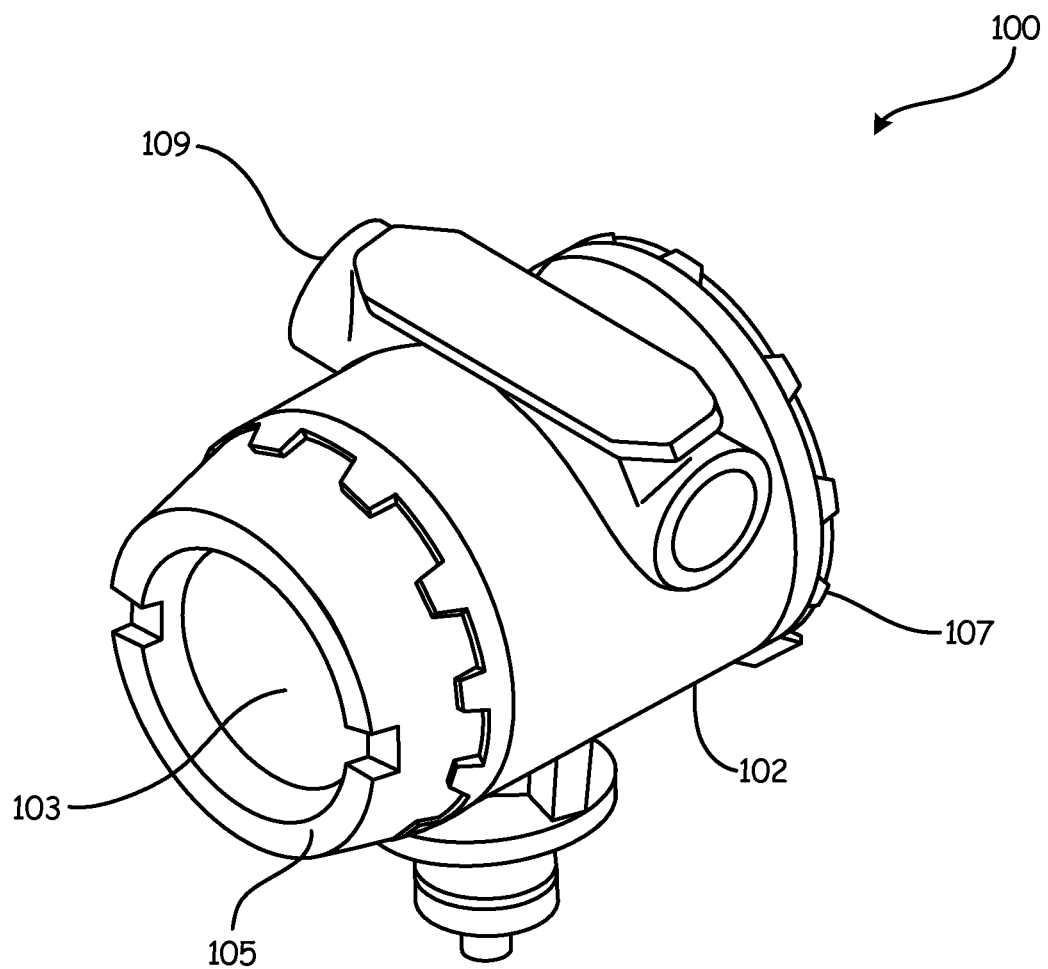
FIG. 3 is a perspective view of a remote indicator in accordance with an embodiment of the present invention.

FIG. 3 is a perspective view of a remote indicator in accordance with an embodiment of the present invention. However, it should be understood that embodiments of the present invention can be practiced with any device able to remotely indicate process information from the field device or on the control loop or segment. Further, embodiments of the present invention can be practiced using any device that employ the NFC interaction in order to simplify a more complicated interaction. For example, a complex configuration/setup could be simplified where a field device communicates with another field device, control system, or handheld configurator, et cetera. In still another example, a field device with an analog input (AI) could be configured to use the analog output (AO) from a different device as that analog input. There would be some complexity in such configuration, but the complexity would be reduced using NFC data sharing between such field devices.

Pursuant to one embodiment, remote indicator 100 includes a robust housing 102 that renders remote indicator 100 suitable for outdoor use. Remote indicator 100 includes a display 103 that provides information relative to one or more field devices communicating on a process control loop or segment or other process monitoring network. In one embodiment, remote indicator 100 has the ability to indicate information relative to a plurality of field devices indicating such information relative to a device tag or field device identifier and selectable engineering units. In such embodiments, the data can be scrolled or otherwise sequentially displayed, as desired. Further still, remote indicator 100 can perform some rudimentary operations on the selected field device information, such as calculating total flow, total mass, or volume over time. Additionally, by virtue of careful design of the circuitry within remote indicator 100 and housing 102, remote indicator 100 can be approved for a variety of potentially hazardous locations. Such approvals include factory mutual (E5) approval as well as I5/IE intrinsically safe use for class 1, division 1 use. Additional certifications include the Canadian Standards Association (CSA) approval E6 for explosion proof for class 1, division 1 use as well as I6/IF intrinsically safe approval for class 1, division 1 use. Further, European certification, such as E1 Atex Flameproof Certification can be provided as well. Accordingly, users of remote indicator 100 can specify a remote indicator 100 for use in a variety of sensitive locations. Remote indicator 100 preferably includes a pair of threaded endcaps 105, 107 that allow access to the interior of remote indicator 100. Additionally, one or more wiring conduits 109 are provided for receiving process wiring, in process wired embodiments.

Figure 4:
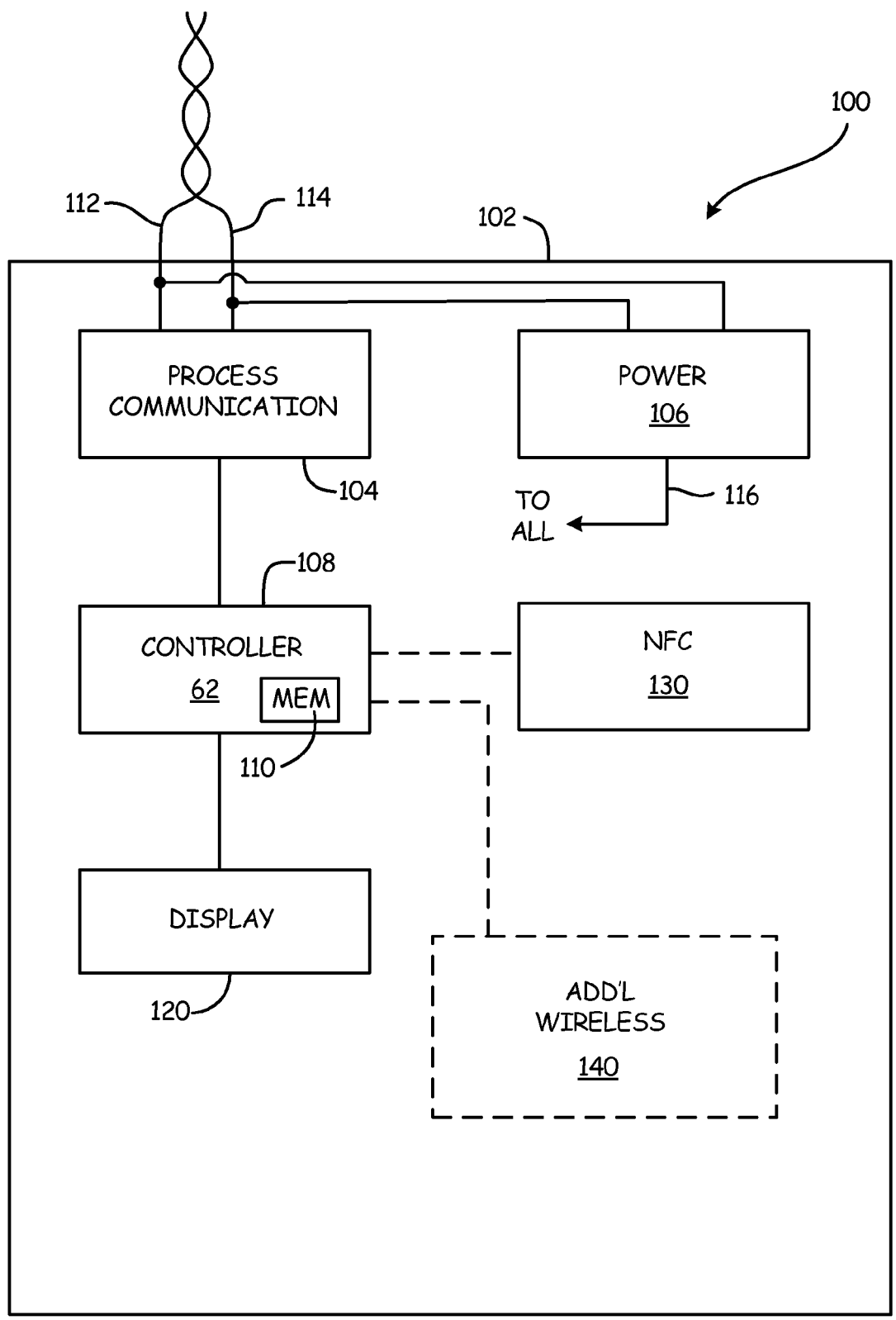
FIG. 4 is a diagrammatic view of the remote indicator shown in FIG. 3.

FIG. 4 is a diagrammatic view of remote indicator 100 (shown in FIG. 3). Remote indicator 100 includes housing 102 containing process communication circuitry 104, power module 106, controller 108, and memory 110. While these components may be the same or similar to components used within process variable transmitter 50, they need not be so and thus separate reference numbers are used. However, in the illustrated embodiment, process communication circuitry 104 of remote indicator 100 is configured to couple to a process variable loop or segment via a plurality of conductors 112, 114. Of course, in embodiments that employ wireless communication, conductors 112, 114 would not be necessary. Further, power module 106 is also coupled to conductors 112, 114 in order to provide operating power to the components of remote indicator 100, as indicated by arrow 116 labeled "To All." In a wireless embodiment, the power module could include a battery or other power device. Controller 108 is, in some embodiments, a microprocessor that is configured to employ process communication circuitry 104 to identify or receive process variable information provided on a process control loop or segment for which remote indicator 100 is configured to display. Controller 108 may include, or be coupled to, suitable memory 110 in order to store programmatic instructions as well as configuration information relative to the process variable information for which remote indicator 100 is configured to display. Additionally, remote indictor 100 includes a display 120 coupled to controller 108 such that remote indictor 100 can provide a visual indication of the process variable information. In some embodiments, display 120 may be a liquid crystal display. However, embodiments of the present invention can be practiced using any suitable display technology including LED displays, e-ink, vacuum fluorescent displays (VFDs), organic light-emitting diode (OLED) or any other suitable display technology.

In accordance with an embodiment of the present invention, remote indicator 100 includes near field communication (NFC) tag 130. In one embodiment, near field communication tag 130 is a passive tag that is configured to receive power, not from a source within remote indicator 100, but from an external source, such as NFC transceiver 70 (shown in FIG. 2). In such an embodiment, passive NFC tag 130 contains identifying information relative to remote indicator 100 such that provision of the identifying information to a field device will allow that field device to automatically configure process communication to remote indicator 100 once remote indicator 100 is suitably coupled to the same process communication loop or segment (wired or wireless) as the field device. Alternatively, the field indicator may be configured to couple directly (i.e. wirelessly) to the field device to display field device process information. However, embodiments of the present invention also include the provision of a fully active near field communication transceiver within remote indicator 100. In such an embodiment, the NFC transceiver would generally be coupled to controller 108, and this is indicated by the dashed line 132. Thus, controller 108 would have access to information stored within the NFC transceiver. Additionally, remote indicator 100 may include an additional wireless communication module 140 allowing remote indicator 100 to communicate in accordance with a longer communication range wireless technology such as a communication technology operating at 2.4 GHz, such as Bluetooth or Wi-Fi. Such communication may be useful in embodiments where the communication between one or more field devices and remote indicator 100 is limited.

Figure 5A:
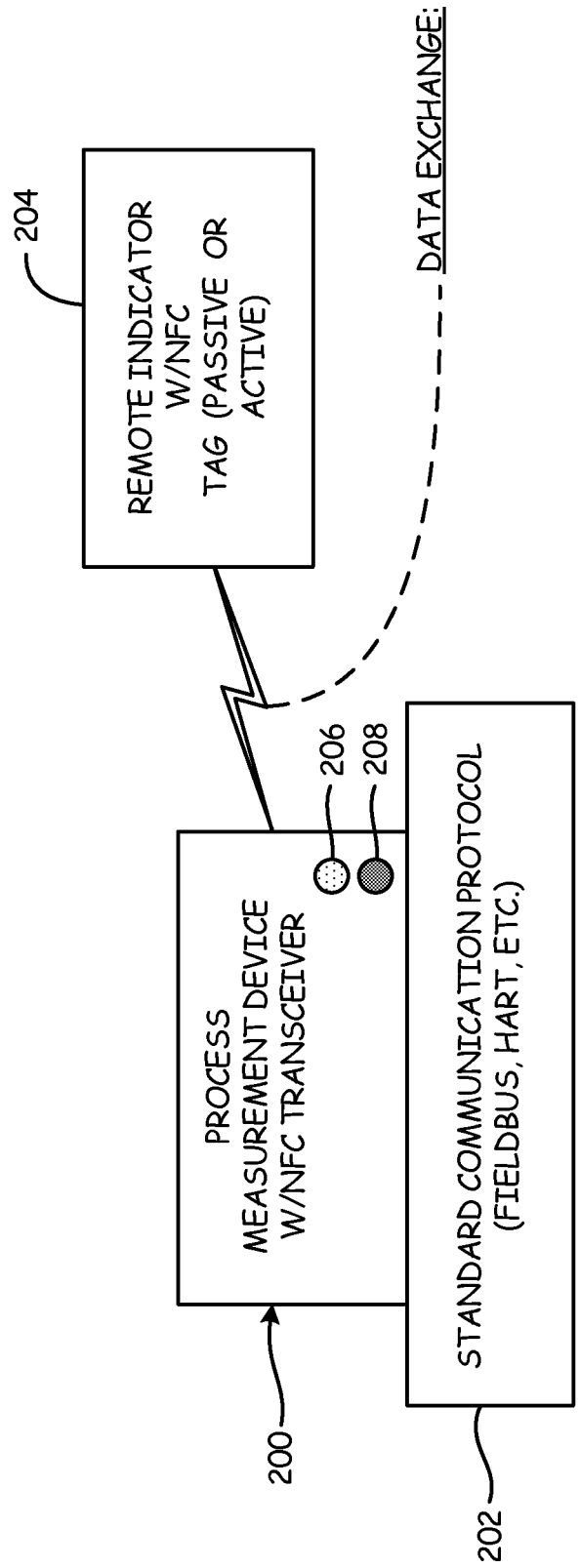
FIG. 5A is a diagrammatic view of a remote indicator being configured to display process variable information from a field device in accordance with an embodiment of the present invention.

FIG. 5A is a diagrammatic view of a remote indicator being configured to display process variable information from a field device in accordance with an embodiment of the present invention. Field device 200 may be currently engaged in sensing and providing process variable information on an operating process communication loop or segment. As shown at block 202, such process communication can include FOUNDATION™ Fieldbus, HART®, or any other suitable wired or wireless process communication protocol. Remote indicator 204 is initially brought within near field communication range of field device 200. For example, this near field proximity may be on the order of one foot or less. Accordingly, remote indicator 204 is not physically coupled to a process communication loop or segment, and is accordingly, not powered. Upon achieving the required proximity, the near field communication transceiver of field device 200 powers and interacts with the passive near field communication tag of remote indicator 204. In some embodiments, field device 200 may provide a visual indication that communication is occurring via the near field communication transceiver. For example, one or more indicators on field device 200, such as LEDs 206, 208 may flash indicating status. For example, a flashing red light on the field device may indicate that the field device is currently communicating using the near field communication transceiver. Alternatively, a flashing red light could indicate the field device is currently undergoing configuration. A green indicator may indicate that the field device has finished near field communication and is fully engaged with the task of process communication and/or monitoring. Alternatively, a green indicator may simply indicate that the device has been fully configured.

Upon achieving near field communication proximity, the near field communication tag or transceiver of remote indicator 204 will provide configuration information to field device 200. This configuration information is interpreted by field device 200 such that field device 200 can configure itself in order to broadcast process variable information to that specific remote indicator 204. However, embodiments of the present invention also include the reverse exchange wherein field device 200 interacts via its near field communication transceiver to write or otherwise save information indicative of itself to remote indicator 204. In this way, remote indicator 204 would subsequently be able to identify information on a process control loop or segment transmitted by that specific field device such that the information would be displayed locally at remote indicator 204. In any event, the NFC proximity is used to engage a cooperative communication between the field device and the remote indicator such that when the remote indicator is subsequently coupled to the same process communication loop or segment to which field device 200 is also coupled, remote indicator 204 will automatically display process variable information from field device 200. Alternatively, the field indicator may couple wirelessly to the field device and display field device process information.

FIG. 5B is a diagrammatic view of field device 200 and remote indicator 204 coupled to process communication loop or segment 14. Subsequent to the NFC configuration illustrated with respect to FIG. 5A, in FIG. 5B, remote indicator 204 is now fully configured. Remote indicator 204 will now receive broadcasts from field device 200 as well as any other field devices for which remote indicator 204 has been configured. This configuration of remote indicator 204 has thus occurred without any technician having to enter information relative to field device 200 or any other configured field devices.

Figure 6:
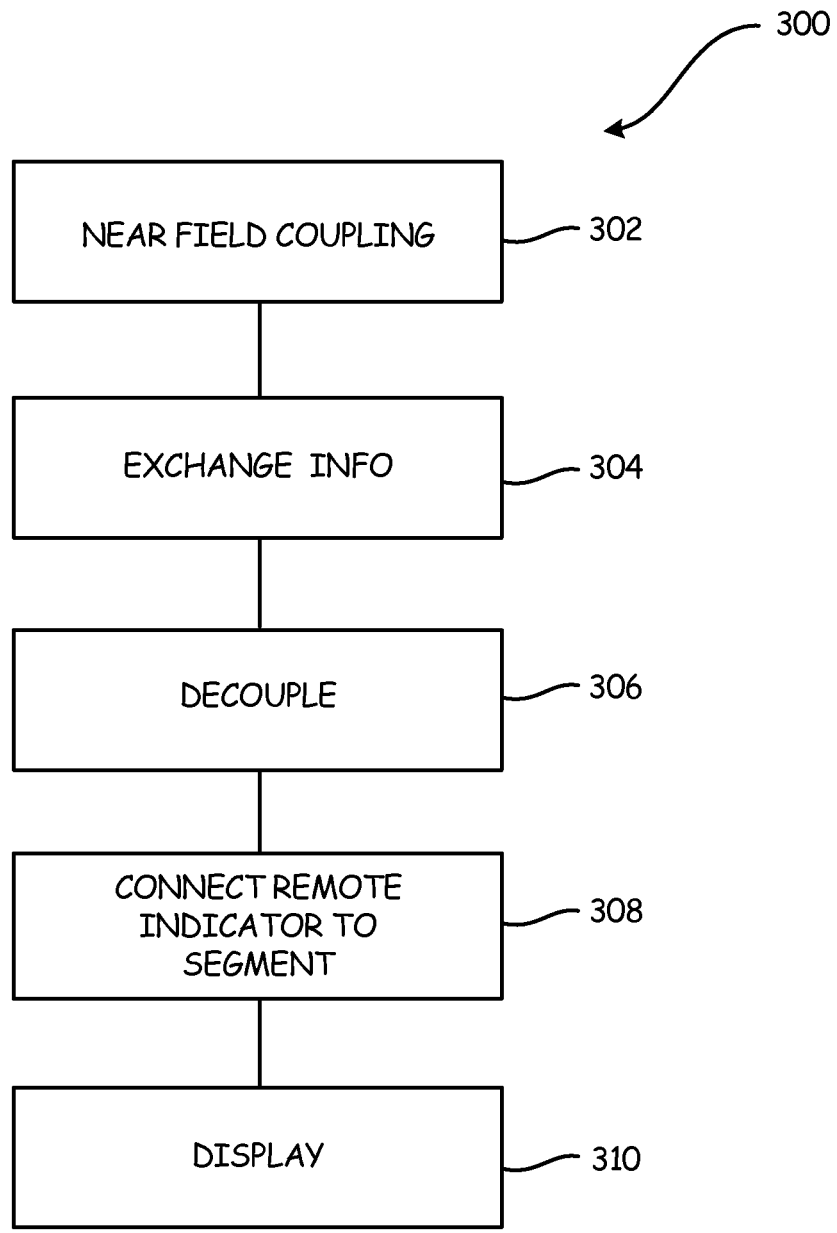
FIG. 6 is a flow diagram of a method of configuring a remote indicator in accordance with an embodiment of the present invention.

FIG. 6 is a flow diagram of a method of configuring a remote indicator in accordance with an embodiment of the present invention. Method 300 begins at block 302 where a remote indicator is brought into near field communication proximity with a field device. The near field communication proximity is any range that is sufficient to enable near field communication between the remote indicator and the field device. In one example, this proximity is one foot or less. However, in embodiments where both NFC devices are active, longer ranges are possible. Next, at block 304, configuration information is exchanged between the field device and the remote indicator. As set forth above, in one embodiment, the field device will read configuration information from the remote indicator and subsequently configure itself to broadcast information over the process communication loop or segment to which it is coupled to the remote indicator. At block 306, the near field communication coupling is ceased. This decoupling is typically in the form of simply moving the remote indicator beyond the near field communication proximity. However, embodiments of the present invention also include the technician pressing or otherwise engaging a user interface element of the field device or the remote indicator in order to affirmatively end the session. Next, at block 308, the remote indicator is coupled to a process communication loop or segment. In one embodiment, this is the same process communication loop or segment as that on which the field device was operating. However, in embodiments where the remote indicator includes an additional wireless communication protocol capability, such as Bluetooth or Wi-Fi, the remote indicator need not be coupled to the same process communication loop or segment as the field device, but simply any process communication loop or segment that can provide sufficient power to operate the remote indicator or the indicator may be self-powered (i.e. battery). Of course, in such an embodiment, the field device itself would also need to include, or be coupled to a suitable wireless communication module such that the process variable information could be transmitted to the remote indicator via the Bluetooth or Wi-Fi protocol. Next, at block 310, the process variable information for which the remote indicator has been configured is displayed. As set forth above, the remote indicator may display process variable information relative to a plurality of field devices as well as provide rudimentary operations on such process variable information in order to display calculated values, such as mass flow or total volume per unit time.

An additional feature of embodiments of the present invention where the remote indicator includes an optional additional wireless protocol module, such as Bluetooth or Wi-Fi is that additional devices can be used to interact with the remote indicator. For example, a smartphone, or tablet with near field communication abilities could be used to interact with the remote indicator in order to automatically pair the remote indicator and the smartphone or tablet such that additional operations could be performed relative to the remote indicator without communication through the process communication loop or segment. For example, the calculation performed by the remote indicator could be adjusted, the units selected for display could be changed, or any other suitable modification could be performed using the user interface of the smartphone or tablet to interact with the processor of the remote indicator. Further, the smartphone or tablet could also be used to display the process information for which the remote indicator is configured. Further still, the smartphone or tablet could be used to troubleshoot and/or repair the indicator or process instrumentation using the higher range wireless protocols.

The provision of an NFC transceiver in a field device facilitates additional features beyond the automatic configuration of remote indicators. For example, a smartphone, tablet or other suitable device with near field communication abilities could be used to interact with the field device to display process information from the field device. Additionally, the smartphone, tablet or other suitable device could be used to configure, commission, troubleshoot, repair or otherwise adjust the field device using NFC communication.

Figure 7:
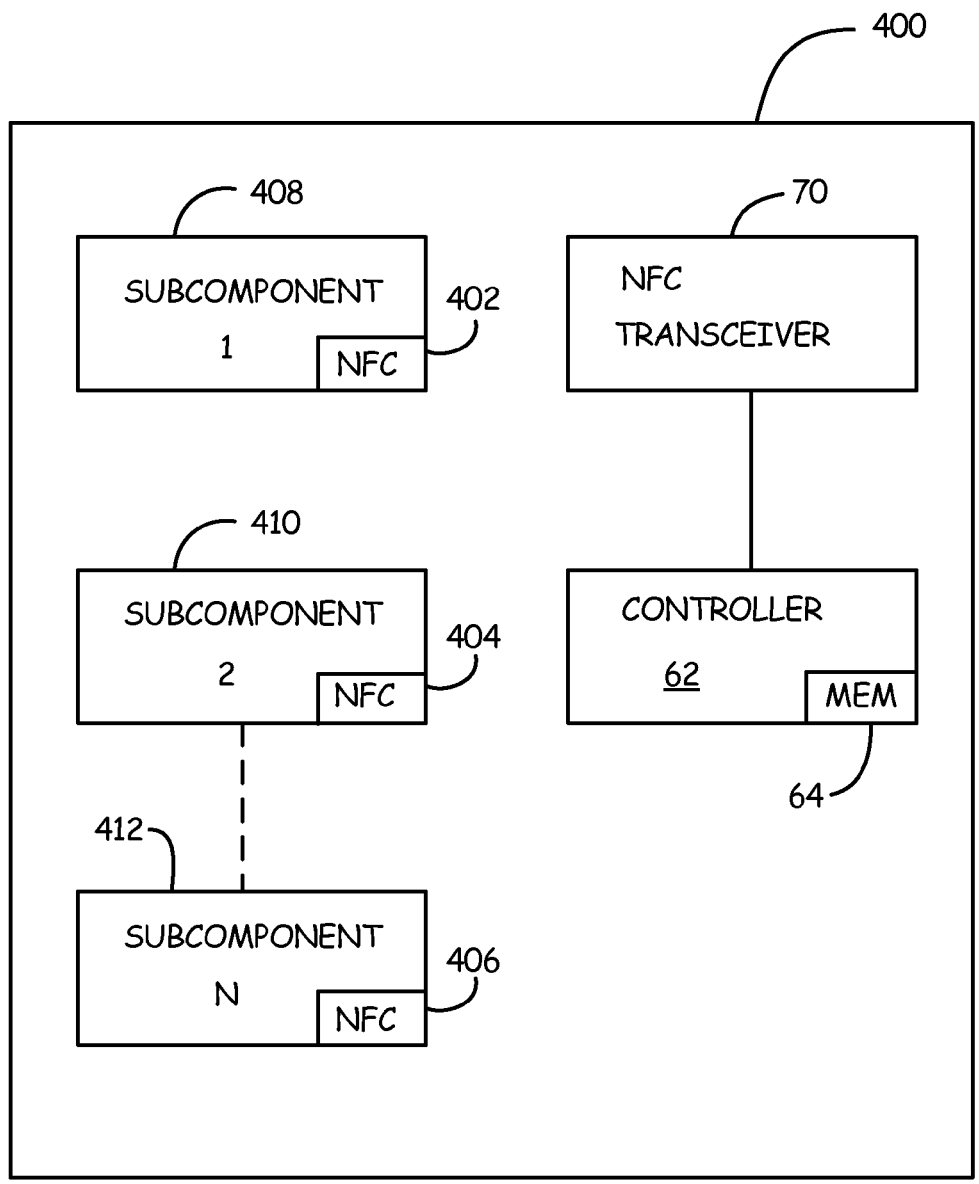
FIG. 7 is a block diagram of a field device in accordance with an embodiment of the present invention.

The near field communication circuits and tags can be combined or added to the field devices and remote indicators in any suitable way. In one embodiment, shown in FIG. 7, multiple near field communication circuits 402, 404, and 406 are embedded in respective subcomponents 408, 410, and 412 of a field device 400. Once field device 400 has been fully assembled by the manufacturer and powered, Controller 62, through NFC transceiver 70, communicates with each subcomponent 408, 410, and 412 in order to determine if the subcomponents present in field device 400 match the configuration that was specified for field device 400. For example, subcomponent 408 may be a process communication subcomponent that provides process communication in accordance with the FOUNDATION™ Fieldbus protocol. Accordingly, near field communication circuit 402 will indicate that subcomponent 408 is a process communication subcomponent and that subcomponent 408 is configured for the FOUNDATION™ Fieldbus protocol. If the field device was specified to communicate in accordance with a different protocol and upon powering up determined that subcomponent 408 was not the proper subcomponent, an error or other suitable indication could be generated by the field device in order to be reworked or otherwise addressed. In this way, the matching NFC identities of the subcomponents can be used to ensure that the correct subcomponents were used to build the field device. Another way in which NFC technology of embodiments of the present invention can be leveraged for additional purposes is for electronic forensics. For example, a near field communication circuit could be provided in a feature board disposed within the field device and/or the remote indicator.

Figure 8:
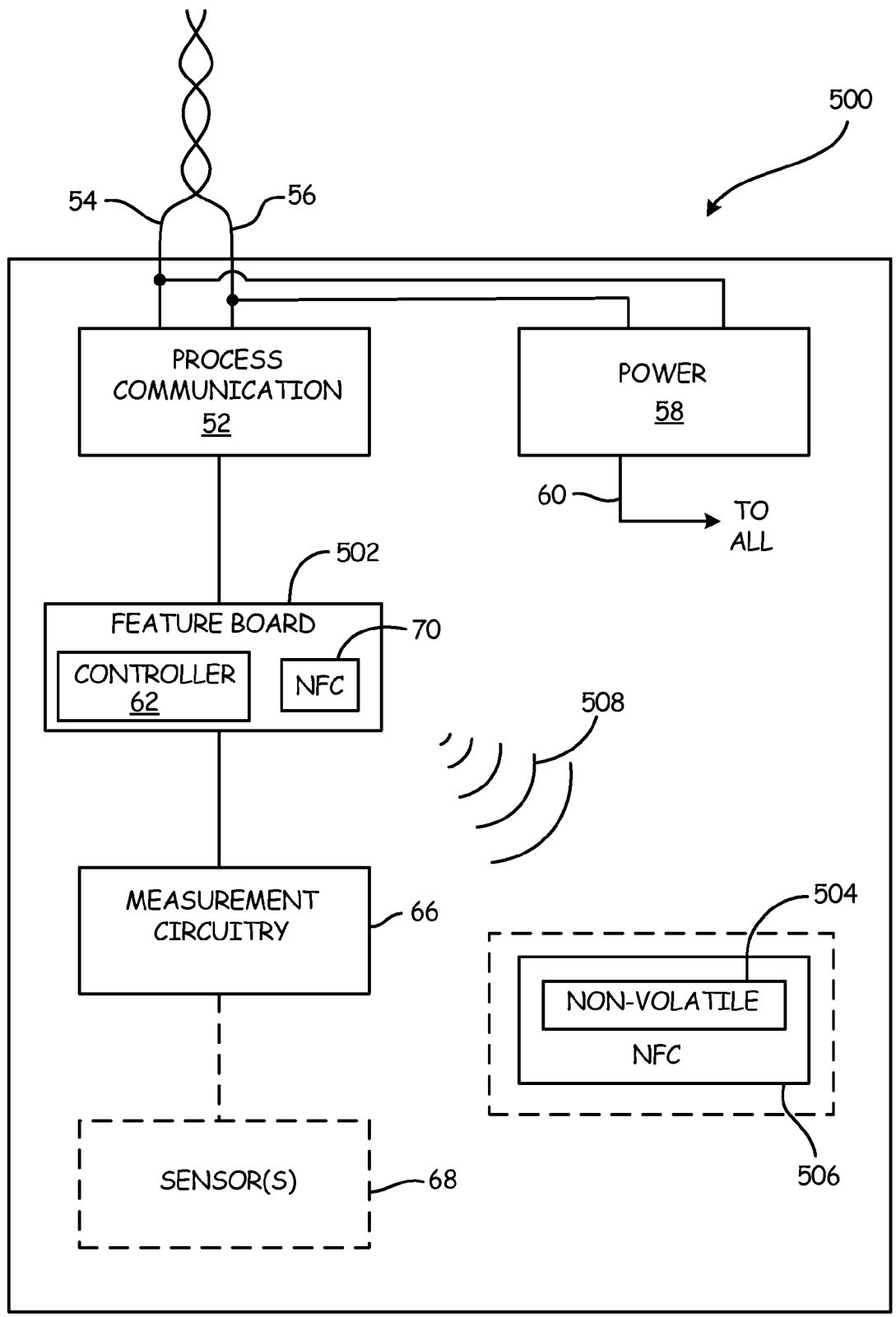
FIG. 8 is a block diagram of a field device in accordance with another embodiment of the present invention.

FIG. 8 is a block diagram of field device 500 in accordance with an embodiment of the present invention. Many components of field device 500 are the same as that of process variable transmitter 50 (shown in FIG. 2) and like components are numbered similarly. In contrast to process variable transmitter 50, near field communication transceiver 70 of process variable transmitter 50 is disposed on feature board 502. A feature board is an add-on component of a field device that is sized to fit within the housing of a field device and provide an additional "feature." A feature board is a circuit board that contains a central processing unit and supporting components. The feature board also typically connects to the wiring of the field device in a defined manner. In the example shown in FIG. 8, feature board 502 is used for logging diagnostic information or other suitable information to non-volatile memory 504 embedded within near field communication circuit 506 that is disposed within but electrically isolated from field device 500. However, embodiments of the present invention can be practiced where the near field communication circuit is part of feature board 502 or on its own separate circuit board. Feature board 502 broadcasts a wireless signal 508 and powers near field communication chip 506 wirelessly providing the diagnostic information which is completely isolated and protected from electronic failure regardless of the failure conditions. This non-volatile memory 504 can be used essentially as a black box that contains essential information used in diagnosing failure conditions just prior to a failure of field device 500.

Although the present invention has been described with reference to preferred embodiments, workers skilled in the art will recognize that changes may be made in form and detail without departing from the spirit and scope of the invention.

What is claimed is:

1. A method of automatically configuring an intrinsically safe remote indicator associated with an operating field device, the method comprising:
placing the remote indicator within near field communication range of the operating field device, wherein the operating field device is configured to measure a process characteristic and communicate a process variable;
wirelessly exchanging configuration information between the remote indicator and the operating field device;
coupling the remote indicator to receive process information through a process communication module of the remote indicator;
receiving process information indicative of the process variable via the coupling;
displaying the process information from the operating field device on the remote indicator; and
wherein wirelessly exchanging configuration information includes providing information from the remote indicator to the operating field device to allow the operating field device to undergo reconfiguration such that the operating field device broadcasts process information to the remote indicator.

2. The method of claim 1, wherein the near field communication range is less than or equal to about one foot.

3. The method of claim 1, and further comprising powering a near field communication circuit of the remote indicator with a near field communication transceiver of the field device.

4. The method of claim 3, wherein the process information is broadcast through a process communication loop or segment.

5. The method of claim 4, wherein the field device is coupled to the process communication loop or segment.

6. The method of claim 5, wherein the process information is communicated in accordance with a process communication protocol.

7. The method of claim 3, wherein the process information is broadcast through a different wireless communication protocol.

8. The method of claim 1, wherein the remote indicator is wholly powered by the process communication loop or segment.

9. A field device comprising:
process communication circuitry configured to communicate in accordance with a process communication protocol;
a power module configured to provide power to components of the field device;
measurement circuitry operably coupleable to at least one sensor, the measurement circuitry being configured to measure an analog signal of the at least one sensor and provide an indication of the measurement;
a controller coupled to the process communication circuitry, the power module, and the measurement circuitry, the controller being configured to receive the indication of the measurement from the measurement circuitry and compute a process variable and convey process variable information using the process communication circuitry;
a near field communication transceiver coupled to the controller to allow the controller to communicate with near field communication devices located within near field communication range of the field device, wherein the near field communication transceiver is disposed on a feature board of the field device; and
a near field communication circuit having non-volatile memory, wherein the near field communication circuit is configured to communicate with the near field communication transceiver disposed on the feature board, but is electrically isolated from other components of the field device.

10. The field device of claim 9, wherein the process communication circuitry and the power module are configured to couple to a process communication loop or segment.

11. The field device of claim 10, wherein the near field transceiver is configured to power a near field communication tag located within near field communication range of the field device.

12. The field device of claim 10, and further comprising a wireless communication module coupled to the controller.

13. The field device of claim 12, wherein the controller is configured to pair with a device using the near field communication transceiver and subsequently communicate with the paired device using the wireless communication module.

14. The field device of claim 13, wherein the wireless communication module operates at 2.4 GHz.

15. The field device of claim 14, wherein the wireless communication module is a Bluetooth module.

16. The field device of claim 14, wherein the wireless communication module is a WiFi module.

17. A remote indicator comprising:
- process communication circuitry configured to couple to a process communication loop or segment and communicate in accordance with a process communication protocol;
- a power module configured to couple to the process communication loop or segment and provide power to components of the remote indicator;
- a display configured to visually indicate process variable information;
- a controller coupled to the process communication circuitry, the power module, and the display, the controller being configured to receive process variable information from a field device coupled to the process communication loop or segment, the controller being configured to cause the display to show the process variable information; and
- a near field communication circuit storing configuration information configured to be exchanged with the field device, wherein the configuration information enables the field device to undergo reconfiguration such that the field device broadcasts the process variable information over the process communication loop or segment to the remote indicator.

18. The remote indicator of claim 17, and further comprising an additional wireless communication module coupled to the controller.

19. The remote indicator of claim 18, wherein the process variable information is received through the additional wireless communication module.

20. The remote indicator of claim 19, wherein the additional wireless communication module communicates at a frequency of about 2.4 GHz.

21. The remote indicator of claim 17, wherein the process variable information is received through the process communication circuitry.

22. A field device comprising:
- a plurality of subcomponents, each subcomponent having a respective subcomponent near field communication tag;
- a near field communication transceiver disposed within the field device and configured to communicate with the near field communication tag of each of the plurality of subcomponents, wherein the near field communication transceiver is disposed on a feature board of the field device;
- a near field communication circuit having non-volatile memory, wherein the near field communication circuit is configured to communicate with the near field communication transceiver disposed on the feature hoard, but is electrically isolated from other components of the field device; and
- a controller coupled to the near field communication transceiver and configured to identify each of the plurality of subcomponents using the near field communication transceiver and to compare the identified subcomponents with a specified configuration to determine if the field device has the correct subcomponents.

23. A method of operating a field device, the method comprising:
- providing an intrinsically safe near field communication transceiver within the field device;
- providing an intrinsically safe near field communication circuit within the field device, but electrically isolated from the field device; and
- communicating diagnostic information concerning operation of the field device, from the near field communication transceiver to the isolated near field communication circuit to store the diagnostic information in non-volatile memory of the near field communication circuit.

* * * * *

UNITED STATES PATENT AND TRADEMARK OFFICE
CERTIFICATE OF CORRECTION

PATENT NO. : 9,860,676 B2
APPLICATION NO. : 14/691955
DATED : January 2, 2018
INVENTOR(S) : Virgilio D. Sandoval-Castillo et al.

Page 1 of 1

It is certified that error appears in the above-identified patent and that said Letters Patent is hereby corrected as shown below:

In the Claims

Column 12
Claim 22:
Line 17:
Change "hoard" to "board"

Signed and Sealed this
Thirteenth Day of February, 2018

Andrei Iancu
*Director of the United States Patent and Trademark Office*